United States Patent
Kitanaka

(10) Patent No.: US 8,049,455 B2
(45) Date of Patent: Nov. 1, 2011

(54) ELECTRIC POWER CONVERTER

(75) Inventor: Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 287 days.

(21) Appl. No.: 12/444,996

(22) PCT Filed: Oct. 19, 2006

(86) PCT No.: PCT/JP2006/320847
§ 371 (c)(1),
(2), (4) Date: Apr. 9, 2009

(87) PCT Pub. No.: WO2008/047439
PCT Pub. Date: Apr. 24, 2008

(65) Prior Publication Data
US 2010/0079093 A1    Apr. 1, 2010

(51) Int. Cl.
*H02H 3/00* (2006.01)
*H02H 7/08* (2006.01)
*G05B 9/00* (2006.01)

(52) U.S. Cl. ............ 318/563; 361/42; 361/23; 388/903; 324/500

(58) Field of Classification Search ........... 318/563, 318/479, 490, 800; 361/18, 23, 30, 31, 88, 361/90, 42; 388/903; 324/500, 511, 512, 324/772
See application file for complete search history.

(56) References Cited

U.S. PATENT DOCUMENTS

| | | | | |
|---|---|---|---|---|
| 4,428,022 A * | 1/1984 | Engel et al. | ...................... | 361/96 |
| 5,179,842 A * | 1/1993 | Kanazawa | ...................... | 62/158 |
| 5,420,491 A * | 5/1995 | Kanzaki et al. | ................ | 318/727 |
| 5,440,441 A * | 8/1995 | Ahuja | .............................. | 361/62 |
| 5,627,737 A | 5/1997 | Maekawa et al. | | |
| 6,002,221 A | 12/1999 | Ochiai et al. | | |
| 6,278,256 B1 | 8/2001 | Aoyama | | |
| 6,856,137 B2 * | 2/2005 | Roden et al. | ................... | 324/509 |
| 7,079,406 B2 * | 7/2006 | Kurokami et al. | .......... | 363/56.03 |
| 7,466,137 B2 * | 12/2008 | Ariyoshi | ........................ | 324/426 |
| 7,557,583 B2 * | 7/2009 | Zettel et al. | .................... | 324/418 |
| 7,847,499 B2 * | 12/2010 | Nakamura et al. | ........ | 318/400.27 |
| 7,893,637 B2 * | 2/2011 | Suhama et al. | ................ | 318/376 |
| 2003/0067723 A1 * | 4/2003 | Suzui et al. | ...................... | 361/42 |
| 2005/0243491 A1 * | 11/2005 | Tanis | ............................ | 361/104 |
| 2006/0198068 A1 | 9/2006 | Takahashi et al. | | |

(Continued)

FOREIGN PATENT DOCUMENTS

JP    59-153776 A    9/1984

(Continued)

OTHER PUBLICATIONS

Office Action dated Oct. 20, 2010, issued in the corresponding Chinese Patent Application No. 200680056154.6, and an English Translation thereof.

(Continued)

*Primary Examiner* — Eduardo Colon-Santana
(74) *Attorney, Agent, or Firm* — Buchanan Ingersoll & Rooney PC

(57) ABSTRACT

Specific anomalies and details of failures as well as measures thereagainst are described that might possibly occur in electric power converters that drive and control permanent-magnet synchronous motors. An electric power converter capable of stable operation has a protective function of taking proper measures against such failures that might possibly occur.

4 Claims, 4 Drawing Sheets

U.S. PATENT DOCUMENTS

| | | | |
|---|---|---|---|
| 2006/0224360 A1* | 10/2006 | Kishimoto | 702/183 |
| 2009/0237016 A1* | 9/2009 | Iwashita et al. | 318/400.3 |
| 2010/0010684 A1* | 1/2010 | Lorenz et al. | 700/293 |

FOREIGN PATENT DOCUMENTS

| | | | |
|---|---|---|---|
| JP | 61-70342 A | 5/1986 |
| JP | 63-257468 A | 10/1988 |
| JP | 07-031001 A | 1/1995 |
| JP | 07-131937 | 5/1995 |
| JP | 07-322626 A | 12/1995 |
| JP | 08-182105 A | 7/1996 |
| JP | 09-046813 A | 2/1997 |
| JP | 09-121592 | 5/1997 |
| JP | 09-182453 A | 7/1997 |
| JP | 09-247805 A | 9/1997 |
| JP | 09-312994 A | 12/1997 |
| JP | 10-257778 A | 9/1998 |
| JP | 11-103585 A | 4/1999 |
| JP | 11-275869 A | 10/1999 |
| JP | 2000-032772 A | 1/2000 |
| JP | 2002-189064 A | 7/2002 |
| JP | 2003-264901 A | 9/2003 |
| JP | 2005-174634 A | 6/2005 |
| JP | 2005-218186 A | 8/2005 |
| JP | 2005-328619 | 11/2005 |
| JP | 2005-354789 A | 12/2005 |
| JP | 2006-211782 A | 8/2006 |

OTHER PUBLICATIONS

Office Action (Notice of Preliminary Rejection) dated Nov. 16, 2010, issued in the corresponding Korean Patent Application No. 2009-7007209, and an English Translation thereof.

International Search Report (PCT/ISA/210) Jan. 16, 2007.

* cited by examiner

ELECTRIC POWER CONVERTER

TECHNICAL FIELD

The present invention relates to electric power converters that drive and control permanent-magnet synchronous motors.

BACKGROUND ART

Permanent-magnet synchronous motors (hereinafter simply referred to as "motors") are known as high-efficiency motors in comparison with most-used conventional induction motors, because magnetic field is established by the permanent magnet which results in no need for excitation current and no current flows through the rotor which results in no secondary copper loss. While induction motors are conventionally used in electric railway cars, application of permanent-magnet synchronous motors to electric railway cars has been investigated in recent years to enhance efficiency thereof.

In electric power converters used in controllers of electric railway cars that drive and control the permanent-magnet synchronous motors, a stable operation is required in which the possibility of a halt in operation due to failure or of a breakage is reduced to the extreme extent, to ensure stable services of electric railway cars. In order to achieve such a requirement, how to protect the electric power controllers is a most important subject in applying permanent-magnet synchronous motors to electric railway cars. In other words, it is necessary to clarify anomalous phenomena that might possibly occur in the electric power converters and to take proper measures against these anomalies so that excessive operation halting of the power converters is eliminated and the power converters are kept unbroken.

An electric power converter is made up of a large amount of electric/electronic parts, for example, electronic parts such as sensors and a microprocessor, semiconductor parts such as switching elements, electrical conductive members such as cables and bus bars that connect these parts with each other, and insulation members. For this reason, a failure or a malfunction could potentially occur in a constituent element, i.e., in each of the parts making up the electric power converter, and, on this occasion, anomalous phenomena such as an over-current and an over-voltage occur in the circuits. In addition, a temporary over-current or over-voltage may sometimes occur in the circuits by supply-voltage fluctuation specific to electric railways or by various disturbances associated with vibration of a railway car and that from the rails.

Moreover, permanent-magnet synchronous motors, different from induction motors having been most used, always generate voltage during rotation by interaction with magnetic field of the built-in permanent magnets even without electric power externally supplied.

Generally, electric railway cars run with a plurality of cars being coupled into a train, and a plurality of electric power converters and motors are each distributedly mounted on the plurality of cars. Thus, even when, for example, an electric power converter among the plurality of electric power converters on the train happens to halt owing to a failure, the railway cars can continue to run by the other normal motors. On the other hand, the motor connected with the halted electric power converter is forced to rotate continuously by the wheels, to generate a voltage in proportion to the rotation speed thereof.

Accordingly, depending on types of failures occurring in the electric power converter during running of the railway cars, a current is continuously supplied to the failure part by the motor-generated voltage, so that the failure part might be further damaged or might causes heat build-up.

For such a case, a protective function is required for preventing the electric power converter from breaking, in such a manner that a system controller monitors signals from a voltage sensor, a current sensor, or thee like provided in the electric power converter and, when a monitored value, for example, exceeds a predetermined one or the like, the system controller determines that an anomalous phenomenon has occurred and turns off internal contactors and switching elements according to predetermined logic rules.

However, it is improper to turn off all the contactors and switching elements in the electric power converter when an anomalous phenomenon occurs, because it takes time to restart the electric power converter, which retards on-time service of the railway cars, and operation counts of the contactors and the like increases more than necessary, which accelerates wear of moving parts thereof. Moreover, damage of anomalous portions might increase if improper measures are taken. The electric power converter therefore needs to have a protective function that allows proper measures to be taken against various types of anomalous phenomena and failures occurring in the electric power converter in order to prevent the converter from being damage while avoiding excessive operation halting thereof.

A method is disclosed as a prior art in Patent Document 1, in which, supposing the case where a failure occurs in an inverter that drives and controls a permanent-magnet synchronous motor while the electric railway cars are running, contactors are provided for shutting off the connection between the inverter and the permanent-magnet synchronous motor so as not to cause a further damage of the inverter by the motor-generated electric power, whereby the inverter and the permanent-magnet synchronous motor are isolated from each other by the contactors when a failure of the inverter is detected.

Patent Document 1: Japanese Patent Application Laid-Open No. H08-182105.

SUMMARY OF THE INVENTION

Problems that the Invention is to Solve

According to the method in Patent Document 1, since the inverter and the permanent-magnet synchronous motor can be isolated from each other by the contactors when a failure of the inverter is detected, it is possible to prevent the failure portion from further damaged as described above by the motor generated electric power under the running. Patent Document 1 cited above describes that the contactors interposed between the inverter and the motor are turned off when the inverter breaks down, but does not describe any specific anomalous phenomena that might possibly occur in each part inclusive of the inverter, of the electric power converter, nor how to take measures against details of the individual anomalous phenomena.

As is described above, it is significantly important for stable services of electric railway cars to provide beforehand a protective function of taking proper measures against specific anomalous phenomena that might possibly occur in electric power converters. However, it is impossible by the subject matter in Patent Document 1 to take measures against specific anomalous phenomena that might possibly occur in electric power converters.

The present invention is devised to solve the problem described above, and an object of the invention is to provide an electric power converter having a protective function that allows measures to be taken against various anomalous phenomena that might possibly occur in the electric power converter that drives and controls a permanent-magnet synchronous motor.

Means for Solving the Problems

An electric power converter according to the present invention is provided with a converter having switching elements, for converting AC power from an AC power supply into DC power; a capacitor connected in parallel to the DC side of the converter; an inverter having switching elements, connected in parallel with the capacitor, for driving and controlling a permanent-magnet synchronous motor; a discharge circuit connected in parallel with the capacitor; a supply-side switch interposed between the AC power supply and the AC side of the converter; a motor-side switch interposed between the inverter and the permanent-magnet synchronous motor; a supply-voltage sensor for measuring voltage of the AC power supply; a capacitor-voltage sensor for measuring voltage across the capacitor; an input-current sensor for measuring AC current to the converter; an output-current sensor for measuring AC current from the inverter; and a system controller for controlling the supply-side switch, the converter, the discharge circuit, the inverter, and the motor-side switch by receiving input signals from the supply-voltage sensor, the capacitor-voltage sensor, the input-current sensor, and the output-current sensor, wherein said system controller, when a voltage measured by said capacitor-voltage sensor becomes equal to or lower than a first predetermined value, turns off all switching elements of said converter and all switching elements of said inverter; when the voltage measured by said capacitor-voltage sensor becomes equal to or lower than a second predetermined value that is smaller than the first predetermined value, turns off said supply-side switch; and when the voltage measured by said capacitor-voltage sensor becomes higher than the second predetermined value, does not turn off said supply-side switch.

An electric power converter according to another aspect of the present invention is provided with a converter having switching elements, for converting AC power from an AC power supply into DC power; a capacitor connected in parallel to the DC side of said converter; an inverter having switching elements and being connected in parallel with said capacitor, for driving and controlling a permanent-magnet synchronous motor; a discharge circuit connected in parallel with said capacitor; a supply-side switch interposed between the AC power supply and the AC side of said converter; a motor-side switch interposed between said inverter and the permanent-magnet synchronous motor; a power-voltage sensor for measuring voltage of the AC power supply; a capacitor-voltage sensor for measuring voltage across said capacitor; an input-current sensor for measuring AC current to said converter; an output-current sensor for measuring AC current from said inverter; and a system controller for controlling said supply-side switch, said converter, said discharge circuit, said inverter, and said motor-side switch by receiving input signals from said power-voltage sensor, said capacitor-voltage sensor, said input-current sensor, and said output-current sensor, wherein said system controller, when a voltage measured by said capacitor-voltage sensor becomes equal to or lower than a first predetermined value, turns off all switching elements of said converter and all switching elements of said inverter; when the voltage measured by said capacitor-voltage sensor becomes equal to or lower than a second predetermined value that is smaller than the first predetermined value, turns off said motor-side switch; and when the voltage measured by said capacitor-voltage sensor becomes higher than the second predetermined value, does not turn off said motor-side switch.

EFFECT OF THE INVENTION

The electric power converter according to the present invention is provided with a converter having switching elements, for converting AC power from an AC power supply into DC power; a capacitor connected in parallel to the DC side of the converter; an inverter having switching elements, connected in parallel with the capacitor, for driving and controlling a permanent-magnet synchronous motor; a discharge circuit connected in parallel with the capacitor; a supply-side switch interposed between the AC power supply and the AC side of the converter; a motor-side switch interposed between the inverter and the permanent-magnet synchronous motor; a supply-voltage sensor for measuring voltage of the AC power supply; a capacitor-voltage sensor for measuring voltage across the capacitor; an input-current sensor for measuring AC current to the converter; an output-current sensor for measuring AC current from the inverter; and a system controller for controlling the supply-side switch, the converter, the discharge circuit, the inverter, and the motor-side switch by receiving input signals from the supply-voltage sensor, the capacitor-voltage sensor, the input-current sensor, and the output-current sensor, wherein said system controller, when a voltage measured by said capacitor-voltage sensor becomes equal to or lower than a first predetermined value, turns off all switching elements of said converter and all switching elements of said inverter; when the voltage measured by said capacitor-voltage sensor becomes equal to or lower than a second predetermined value that is smaller than the first predetermined value, turns off said supply-side switch; and when the voltage measured by said capacitor-voltage sensor becomes higher than the second predetermined value, does not turn off said supply-side switch. Therefore, a reliable protective operation can be achieved in a case of a short circuit while preventing unnecessary switching of the supply-side switch.

The electric power converter according to another aspect of the present invention is provided with a converter having switching elements, for converting AC power from an AC power supply into DC power; a capacitor connected in parallel to the DC side of said converter; an inverter having switching elements and being connected in parallel with said capacitor, for driving and controlling a permanent-magnet synchronous motor; a discharge circuit connected in parallel with said capacitor; a supply-side switch interposed between the AC power supply and the AC side of said converter; a motor-side switch interposed between said inverter and the permanent-magnet synchronous motor; a power-voltage sensor for measuring voltage of the AC power supply; a capacitor-voltage sensor for measuring voltage across said capacitor; an input-current sensor for measuring AC current to said converter; an output-current sensor for measuring AC current from said inverter; and a system controller for controlling said supply-side switch, said converter, said discharge circuit, said inverter, and said motor-side switch by receiving input signals from said power-voltage sensor, said capacitor-voltage sensor, said input-current sensor, and said output-current sensor, wherein said system controller, when a voltage measured by said capacitor-voltage sensor becomes equal to or lower than a first predetermined value, turns off all switching elements of said converter and all switching elements of said inverter; when the voltage measured by said capacitor-voltage sensor becomes equal to or lower than a second predetermined value that is smaller than the first predetermined value, turns off said motor-side switch; and when the voltage measured by said capacitor-voltage sensor becomes higher than the second predetermined value, does not turn off said motor-side switch. Therefore, a reliable protective operation can be achieved in a case of a short circuit while preventing unnecessary switching of the motor-side switch.

REFERENCE NUMERALS

Figure 1:
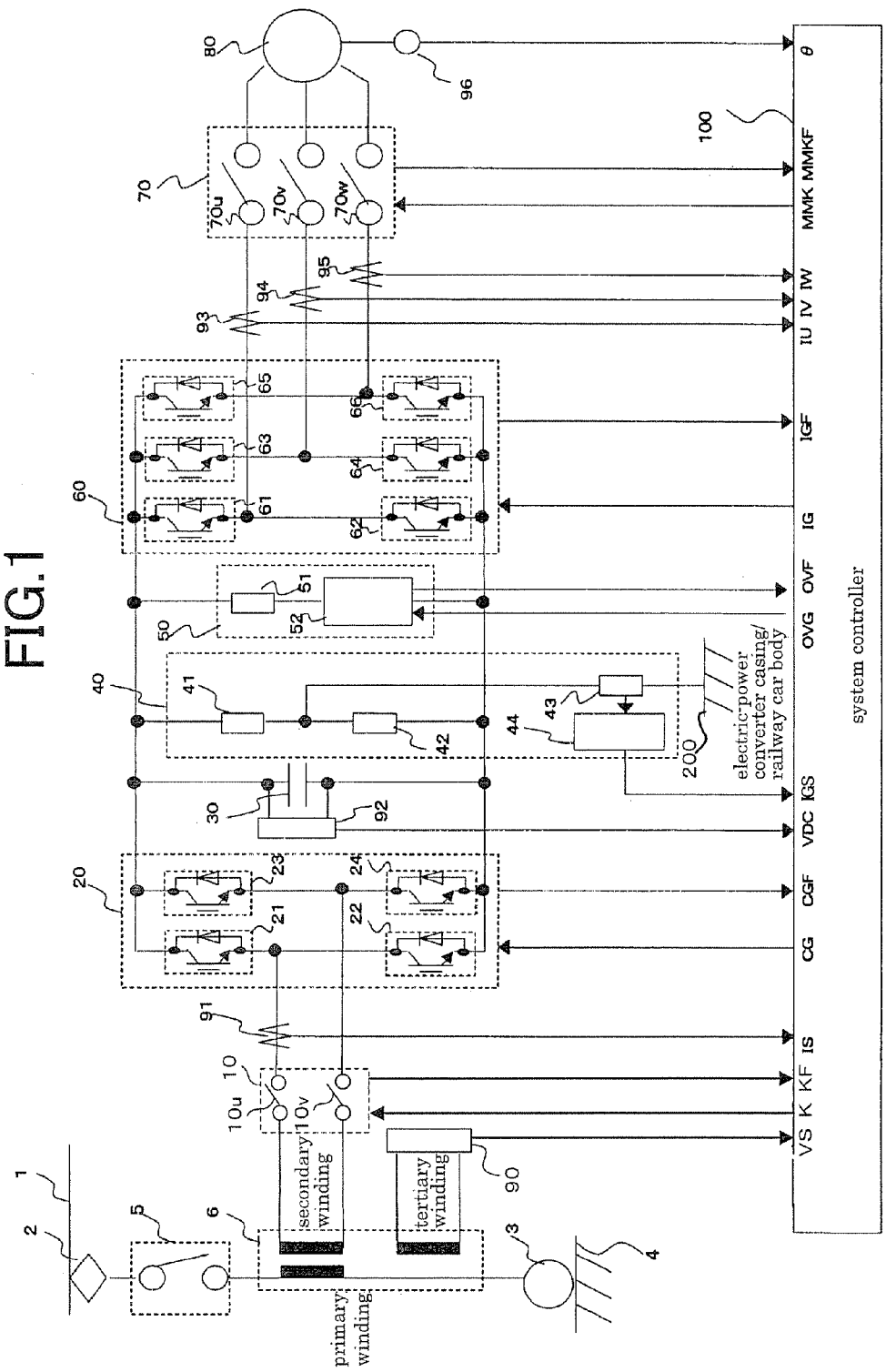
FIG. 1 is a diagram illustrating a configuration example of an electric power converter applied to a controller of an electric railway car, according to Embodiment 1 of the present invention.

1: overhead wire
2: current collector
3: wheels
4: rails
5: breaker
6: transformer
10, 10u, 10v: supply-side contactor
11: main contact
12: electromagnetic coil
13: auxiliary contact
20: converter
21 to 24: switching elements
30: capacitor
40: grounding circuit
41, 42, 43: impedance element
44: ground fault detector
50: discharge circuit
51: resistor
52: switching device
60: inverter
61 to 66: switching elements
70, 70u, 70v, 70w: motor-side contactor
80: permanent-magnet synchronous motor (motor)
90: voltage sensor
91: current sensor
92: voltage sensor
93 to 95: current sensors 96: rotation sensor
100: system controller, and
200: electric-power-converter-casing/railway-car-body.

BEST MODE FOR CARRYING OUT THE INVENTION

Embodiment 1

FIG. 1 is a diagram illustrating a configuration example of an electric power converter applied to a controller of an electric railway car, according to Embodiment 1 of the present invention. As shown in FIG. 1, electric power is supplied into the main circuit of the power converter from an overhead wire 1 (its AC voltage is generally 20 kV-25 kV) through a current collector 2, and fed to the primary side of a transformer 6 through a breaker 5. The other end of the transformer 6 is connected to rails 4 at the ground potential through wheels 3. It is noted that the breaker 5 has a capability of interrupting a fault current generated when a short circuit occurs; on the other hand, a supply-side contactor 10 and a motor-side contactor 70, which will be explained later, have no capability of interrupting such a fault current.

The transformer 6 steps down the voltage input into its primary winding, to output from its secondary and tertiary windings the respective stepped down voltages. The secondary winding voltage is input to a converter 20 through the supply-side contactor 10 that is a supply-side switch and through a current sensor 91 that measures a current input to the converter. On the other hand, a tertiary winding voltage is measured as an AC supply voltage VS by a voltage sensor 90 and is input to a system controller 100.

It is noted here that the voltage sensor 90 is provided aiming to measure the voltage of the overhead wire 1. The voltage sensor 90, while it is preferably disposed on the tertiary side of the transformer 6 as shown in FIG. 1 because of mitigation of a higher harmonics influence from the converter 20 as well as ease of insulation, may be disposed not only on the AC supply side, i.e., on the secondary winding side of the supply-side contactor 10 but also on the primary side of the transformer 6.

The supply-side contactor 10 is interposed between the secondary winding of the transformer 6 and the converter 20. The switching operation of the contactor can be controlled by the system controller 100 through a signal K output therefrom, and its operating status is input into the system controller 100 through a signal FK While FIG. 1 illustrates the configuration such that the two AC input lines both are switched by supply-side contactors 10u and 10v, a contactor may be provided in any one of the AC input lines. A detailed configuration of these contactors will be explained later.

The current sensor 91 measures an input current IS to the converter 20, to output the measured value into the system controller 100. The converter 20 is made up of a bridge circuit formed with switching elements 21, 22, 23, and 24, and converts the input AC voltage into a DC voltage by taking a pulse-width modulation (PWM) control of each switching element in response to a signal CG from the system controller 100, to output the converted voltage. A status of each switching element is fed back into the system controller 100 through a signal CGF. When an over-current occurs in one of the switching elements, when a drive voltage for the switching elements decreases, when an over-temperature is detected in one of the switching elements, and when an operation of the switching elements is not in accordance with the signal. CG, these information is input into the system controller 100 through the signal CGF.

The switching elements 21 to 24 are preferably made up of insulated gate bipolar-transistor (IGBT) elements or intelligent power module (IPM) elements, in each of which an anti-parallel diode is integrated. Since methods of controlling the converter 20 and configurations there of are disclosed in detail in various prior arts, their detailed explanations are omitted. The converter 20, while it is shown as a two-level converter circuit in FIG. 1, may be a converter circuit of three-levels or more.

The output side of the converter 20 is connected in parallel to a capacitor 30 for smoothing the DC voltage. The voltage VDC of the capacitor 30 is measured by a voltage sensor 92, to be output into the system controller 100.

The output side of the converter 20 is further connected to a grounding circuit 40. The grounding circuit 40 divides the DC voltage VDC of the converter 20 by impedance elements 41 and 42, and the connection point of the impedance elements 41 and 42 is grounded to the electric-power converter casing/railway car body 200 through an impedance element 43. The voltage across or current through the impedance element 43 is monitored by a ground fault detector 44, and the monitored value is input into the system controller 100 through a signal IGS. The impedance elements 41 and 42 each are made up of a capacitor and a resistor, or a combination thereof. The impedance element 43 is preferably made up of a resistor.

A discharge circuit 50 that is a discharge means made up of a resistor 51 and a switching device 52 is provided for discharging the capacitor 30. The switching device 52 is turned on and off by the system controller 100 through a signal OVG output therefrom, and operating statuses of the switch is input into the system controller 100 through a signal OVF. The switching device 52 is preferably made up of a switching element such as a thyristor, an IGBT, or an IPM.

An inverter 60 is provided for receiving the DC voltage from the capacitor 30 and converting it into a given AC voltage having a given frequency to be output. The inverter 60 is made up of a bridge circuit formed with switching elements 61, 62, 63, 64, 65, and 66 to take a PWM control of each switching element, based on the signal IG from the system controller 100. A status of each switching element is fed back into the system controller 100 through a signal IGF. When an over-current occurs in one of the switching elements, when a drive voltage for the switching elements decreases, when an over-temperature is detected in one of the switching elements, or when an operation of the switching elements is not in accordance with the signal IG, these information is input into the system controller 100 through the signal IGF.

The switching elements 61 to 66 are preferably made up of IGBT elements or IPM elements, in each of which an anti-parallel diode is integrated. Since methods of controlling the inverter 60 and configurations thereof are disclosed in detail in various prior arts, their detailed explanations are omitted. The inverter 60, while it is shown as a two-level inverter circuit in FIG. 1, may be an inverter circuit of three-levels or more.

Current sensors 93, 94, and 95 that measure output currents from the inverter 60 are provided on the output side thereof. Values measured by each current sensor are input into the system controller 100 as a U-phase current IU, a V-phase current IV, and a W-phase current IW.

A motor-side contactor 70 that is a motor-side switch is provided on the output side of the current sensors 93, 94, and 95, for switching the motor. The motor-side contactor 70 is made up of a U-phase contactor 70u, a V-phase contactor 70v, and a W-phase contactor 70w, and each of their switching operations is controlled by the system controller 100 through a signal MMK output therefrom, and an operating status of each contactor is input into the system controller 100 through a signal MMKF. A detailed configuration of these contactors will be explained later.

The output side of the motor-side contactor 70 is connected to a permanent-magnet synchronous motor 80 ("motor") that drive the electric railway car. A rotor position of the motor is measured by a rotation sensor 96 and is input into the system controller 100 as a position signal θ. A sensorless control that calculates the position signal θ from the voltage and current of the motor 80 may be employed without providing the rotation sensor 96.

Figure 2:
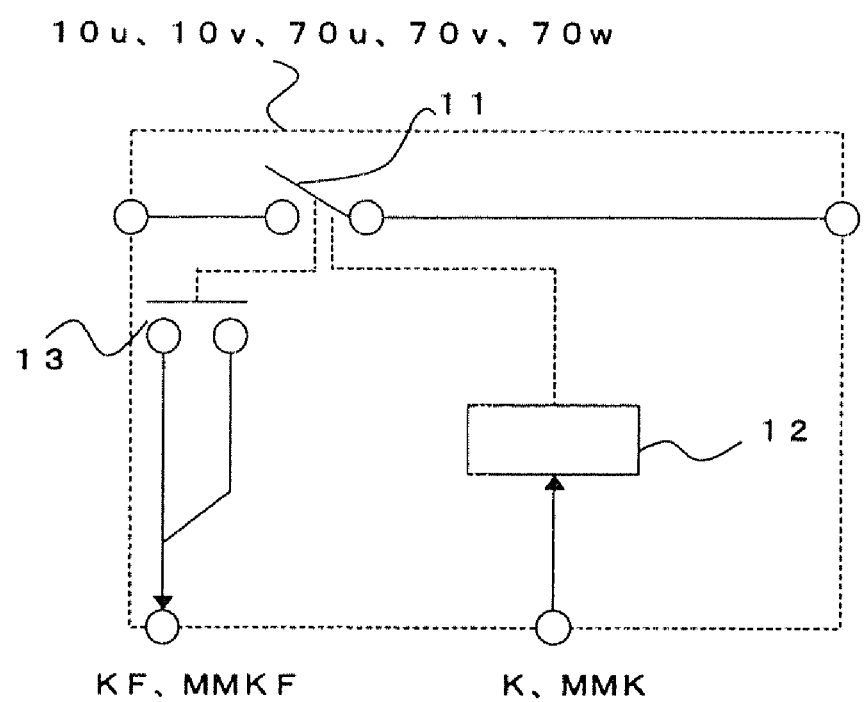
FIG. 2 is a diagram illustrating a configuration example of a supply-side contactor and a motor-side contactor according to Embodiment 1.

The supply-side contactors 10u and 10v, and the motor-side contactors 70u, 70v, and 70w are described here in detail. FIG. 2 is a diagram illustrating a configuration example of the supply-side contactors 10u and 10v, and the motor-side contactors 70u, 70v, and 70w of Embodiment 1. As shown in FIG. 2, each of these contactors is made up of a main contact 11 that turns on and off the main circuit, an electromagnetic coil 12 that drives the main contact 11, and an auxiliary contact 13 that is mechanically linked the main contact so as to be closed in synchronism with closing of the main contact 11 and to be opened in synchronism with releasing thereof.

The electromagnetic coil 12 is turned on and off in response to the signal K or the signal MMK input thereto from the system controller 100, so that the main contact 11 is closed and opened by the driving force by the coil. By providing two different electromagnetic coils, the open and close operations of the main contact 11 may be performed by the individual coils, respectively, or, by providing one electromagnetic coil, the main contact 11 may be closed by force produced by energizing the coil, and opened by a main contact releaser such as a spring when no force is produced by de-energizing the coil.

As for the motor-side contactors 70u, 70v, and 70w, they are preferably configured in such a way that the main contact 11 is opened not by the driving force of the electromagnetic coil 12 but by a spring force or the like, taking into account a situation where a power supply for the coil 12 is stopped. This is for allowing the motor 80 to be isolated from the inverter 60 even in a case of a control power supply for the system controller 100 becoming unavailable, as will be described below. The operating status of the main contact 11 detected through the auxiliary contact 13 is input into the system controller 100 through the signal FK or the signal MMFK.

While the supply-side contactors 10u and 10v and the motor-side contactors 70u, 70v, and 70w are explained above as mechanical type contactors, each of the contactors is not limited thereto as long as it is operable to switch (turn on and off) a circuit and able to check the operation, and may, for example, be a contactless switch of semiconductor type. Moreover, while the auxiliary contact 13 is configured to be closed in synchronism with closing of the main contact 11 and opened in synchronism with opening thereof, the auxiliary contact, on the contrary, may be configured to be opened in synchronism with closing of the main contact 11 and closed in synchronism with opening thereof. In this way, by inputting the status of the auxiliary contact 13 into the system controller 100, the operations of the supply-side contactors 10u and 10v, and the motor-side contactors 70u, 70v, and 70w can be steadily monitored, as will be explained below, by the system controller 100, which allows an anomaly of the contactors to be detected.

Here, the system controller 100 is explained. The system controller 100 receives from the outside, for example, a driver's cab (not shown) of the electric railway car or the like, signals including each operation mode command for forward running, backward running, power running, and regenerative running, a power running notch command, and a brake force command, to control each component of the electric power converter described above. The system controller 100 also receives, from each component, signals indicating operating statuses thereof, as has been described above. By thus configured the system controller 100, each component of the electric power converter can optimally be controlled in response to the signals from the driver's cab or the like.

While FIG. 1 shows the configuration such that one circuit of the converter 20 is connected to the second winding of the transformer 6 and another one circuit of the inverter 60 is connected to the output side of the converter 20, it may be configured plural circuits each having the converter 20 that are connected to the second winding of the transformer 6 and plural circuits each having the inverter 60 that are connected each in parallel to the output side of the converter 20. Such a configuration may also be applicable as with the second winding of the transformer 6 being divided into a plurality of windings to which the converter 20 and the inverter 60 are connected, individually.

With the electric power converter thus configured, details of anomalous phenomena that are likely to occur and proper measures to be taken if the anomalous phenomena occur, will be described below.

Here, the anomalous phenomena are classified into the following three categories in order to be able to take different measures according to importance of the anomalies and to whether the anomalies are transient or not, after the operation of the power converter has been stopped by turning off the switching elements, the supply-side contactor 10, the motor-side contactor 70, or the like:

Category A: an anomaly that allows the power converter to be automatically restarted on condition that a predetermined time (about several seconds) lapses after disappearance of the situation that has been determined as the anomaly;

Category B: an anomaly that allows the power converter to be restarted on condition that the situation disappears that has been determined as the anomaly and also an artificial manipulation such as a manipulation of a reset button is made; and Category C: an anomaly that prohibits restarting itself.

The reason for classifying anomalies into Category A, Category B, and Category C is described. Category A means anomalies that are assumed to occur temporarily by a disturbance such as voltage fluctuation of the overhead wire 1, influence or operation conditions of other electric railway cars, and wheel slipping. Since such anomalies do not lead to immediate breakage of the power converter, automatic restarting is permitted which avoids reducing running performance of the electric railway car due to stop of the power converter.

Category B means anomalies that are not likely to occur by the above-mentioned disturbance but likely to occur by an anomaly in the power converter itself, and might further increase damage thereof by automatic restarting. For that reason, restarting is permitted by mean of an artificial manipulation, that is, only when a person explicitly selects the restarting.

Category C means anomalies that obviously increase damage of the power converter by the restarting, and therefore prohibits the restarting itself.

Furthermore, if an anomaly classified into Category A occurs predetermined times within a predetermined time interval, the anomaly is preferably regarded to be in Category B. For example, when an anomaly in Category A occurs two times in succession within three minutes, the anomaly is conceived that it would probably occur not from a disturbance but in the circuit. Since repeating of the automatic restarting possibly damages the power converter in that case, the anomaly is regarded to be in Category B, that is, the power converter is preferably restarted on condition that an artificial manipulation, such as a manipulation of a reset button (not shown) provided in the drivers' cab or the like, is made after the power converter has been stopped on occurrence of the anomaly by turning off the switching elements, the supply-side contactor 10, the motor-side contactor 70, and the like.

The classification of each of anomalies is listed below.

Category A (1) Input Over-Voltage (abbreviation: VSOV)

(2) Input Under-Voltage (abbreviation: VSLV)

(3) Input Over-Current to Converter (abbreviation: ISOC)

(4) Capacitor Over-Voltage (abbreviation: FCOV)

(5) Capacitor Under-Voltage (abbreviation: FCLV)

(6) Motor Over-Current (abbreviation: MMOC)

Category B (7) Discharge-Circuit Anomaly (abbreviation: OVCRFF)

(8) Charging Anomaly (abbreviation: CHGP)

(9) Microcomputer Anomaly (abbreviation: WDT)

(10) Control Power-Supply Anomaly (abbreviation: PSLV)

(11) Motor Current Imbalance (abbreviation: PUD)

(12) Rotation Sensor Anomaly (abbreviation: RSD)

(13) Ground Fault of Main Circuit (abbreviation: GD)

(14) Contactor Anomaly (abbreviation: KD)

Category C

(15) Converter Switching-Element Anomaly (abbreviation: IPMFDC)

(16) Inverter Switching-Element Anomaly (abbreviation: IPMFDI)

Methods of determining each anomaly and taking measures thereagainst will be described below.

(1) Input Over-Voltage (Abbreviation: VSOV)

When a value of the voltage VS measured by the voltage sensor 90 becomes equal to or higher than a predetermined value, the system controller 100 determines the voltage as an input over-voltage (hereinafter referred to as "VSOV"). This phenomenon is conceived that it occurs from a temporary increase in voltage owing to a supply-side disturbance.

The system controller 100, when detecting a "VSOV", turns off the switching elements 21 to 24 of the converter 20 through the signal CG to stop their switching operations in order to prevent them from damaging. At the same time, the system controller also turns off the switching elements 61 to 66 of the inverter 60 through the signal IG since the turn-off of the switching elements 21 to 24 does not make the capacitor 30 keep the voltage VDC.

If the converter 20 continues its stopped condition, the voltage VDC of the capacitor 30 may fall below a maximum voltage generated by the motor 80. In this case, the capacitor 30 is charged by the generated voltage by the motor 80 through the diodes of the switching elements 61 to 66, so that the voltage VDC becomes equal to the maximum generated voltage. However, since the maximum generated voltage by the motor 80 at the maximum speed of the electric railway car is generally designed to be lower than the maximum acceptable value of the voltage VDC, determined from the withstand voltage of the switching elements 21 to 24 and the switching elements 61 to 66, the power converter suffers no damage. Accordingly, the motor-side contactor 70 may remain 'on'.

On that occasion, the motor-side contactor 70 may, as a matter of course, be turned off. However, that is not preferable, because the contactor 70 entails a mechanical action and frequent switching of the contactor hence leads its contacts and drive mechanism to be worn out, to shorten its life span. The turn-off of the contactor 70 is also not preferable since its turn-on steps necessary for restarting the power converter makes the restart time longer.

If the maximum voltage generated by the motor 80 at the maximum speed of the electric railway car is higher than the maximum acceptable value of the voltage VDC of the capacitor 30 determined from the withstand voltage of the switching elements 21 to 24 and the switching elements 61 to 66, the motor-side contactor 70 is turned off.

(2) Input Under-Voltage (Abbreviation: VSLV)

When a value of the voltage VS measured by the voltage sensor 90 becomes equal to or lower than a predetermined value, the system controller 100 determines that a power failure occurs in the overhead wire 1 and determines the voltage as an input under-voltage (hereinafter referred to as "VSLV"). This phenomenon is conceived that it occurs from a power failure or an abnormal voltage drop of the overhead wire 1.

The system controller 100, when detecting a "VSLV", takes measures similar to those against the "VSOV" in order to prevent the overhead wire 1 from being reversely applied with a voltage from the converter 20. The motor-side contactor 70 may also remain 'on' similarly to the case with the "VSOV".

(3) Input Over-Current to Converter (Abbreviation: ISOC)

When a value of the current IS measured by the current sensor 91 becomes equal to or larger than a predetermined value, the system controller 100 determines the input current to the converter 20 to be excessively large and determines the current as an input over-current to converter (hereinafter referred to as "ISOC"). This phenomenon is conceived that it occurs from a disturbance such as an abrupt change in voltage of the overhead wire 1, an anomaly in control of the converter 20, an anomaly of the switching elements 21 to 24, and a short circuit failure in a part of the main circuit around the input and output ports of the converter 20.

The system controller 100, when detecting an "ISOC", turns off the switching elements 21 to 24 of the converter 20 through the signal CG, to stop their switching operations so that they are not broken by the over-current. The system controller also turns off the switching elements 61 to 66 of the inverter 60 through the signal IG since the turn-off of the switching elements 21 to 24 does not make the capacitor 30 keep the voltage VDC. The system controller also turns off the supply-side contactor 10 through the signal K, if the over-current is caused by a malfunction of the switching elements 21 to 24 (in a state inoperable to switch in accordance with the signal CG), by a short circuit therein, or by a short circuit failure in a part of the main circuit around the input and output ports of the converter 20, because it is difficult to prevent the over-current reliably only by turning off the switching elements 21 to 24.

It is conceived that an "ISOC" is caused mainly by a disturbance such as an abrupt change in voltage of the overhead wire 1. Since both ends of the capacitor 30 are not short-circuited except when short circuits occur simultaneously in a switching element on the upper arm and in that on the lower arm of the converter 20 or when a short circuit failure occurs in the output side thereof, no current flows into the converter from the motor 80 side. The motor-side contactor 70 is therefore not turned off.

In case of short circuits occurring simultaneously in a switching element on the upper arm and in that on the lower arm of the converter 20 or a short circuit failure occurring in the output side thereof, the voltage VDC of the capacitor 30 decreases rapidly as described later. Since the motor-side contactor 70 is turned off with detection of such a rapid decrease, the power converter can be protected even in that situation.

While the voltage VDC of the capacitor 30 may fall below a maximum generated voltage by the motor 80 if the converter 20 continues its stopped condition, the motor-side contactor 70 may remain 'on' as mentioned above.

(4) Capacitor Over-Voltage (Abbreviation: FCOV)

When a value of the voltage VDC measured by the voltage sensor 92 becomes equal to or higher than a predetermined value, the system controller 100 determines the voltage of the capacitor 30 to be excessively large and determines the voltage as a capacitor over-voltage (hereinafter referred to as "FCOV"). This phenomenon is conceived that it occurs when the voltage VDC of the capacitor 30 cannot be normally controlled owing to an anomaly in control of the converter 20 or occurs from a temporary disturbance from the supply side.

The system controller 100, when detecting an "FCOV", turns off the switching elements 21 to 24 of the converter 20 and the switching elements 61 to 66 of the inverter 60 through the signal CG and the signal IG, respectively, to stop their switching operations so that they are not broken by the capacitor voltage VDC having exceeded the withstand voltages of these elements. At the same time, the system controller turns on the discharge circuit 50 through the signal OVG to discharge the capacitor 30 through the switching device 52 and the resistor 51.

On that occasion, when the voltage VDC of the capacitor 30 becomes lower than the supply-side voltage of the converter 20, a current flows into the capacitor 30 and the turned-on discharge circuit 50 from the supply side through the anti-parallel diodes integrated in the switching elements 21 to 24 of the converter 20, whereby the resistor 51 might be damaged by heat. The supply-side contactor 10 is therefore turned off through the signal K.

Similarly, when the voltage VDC becomes lower than the maximum generated voltage by the motor 80, a current flows into the capacitor 30 and the discharge circuit 50 from the motor 80 side through the anti-parallel diodes integrated in the switching elements 61 to 66 of the inverter 60, whereby the resistor 51 might be damaged by heat. The motor-side contactor 70 is therefore turned off through the signal MMK.

(5) Capacitor Under-Voltage (Abbreviation: FCLV)

When a value of the voltage VDC measured by the voltage sensor 92 becomes equal to or lower than a first predetermined value, the system controller 100 determines the voltage VDC of the capacitor 30 to be excessively low and determines the voltage as a capacitor under-voltage (hereinafter referred to as "FCLV"). This phenomenon is conceived that it occurs mainly in situations where a voltage of the overhead wire 1 are dropped by a large amount by the impedance thereof, for example, when the electric railway car runs far from a transformer substation that supplies power to the overhead wire 1 or when another electric railway car under power running is simultaneously on the same overhead wire from which the car receives the electric power.

The system controller 100, when detecting an "FCLV", turns off the switching elements 21 to 24 and the switching elements 61 to 66 through the signal CG and the signal IG, respectively, to stop their switching operations, in order to prevent the capacitor voltage VDC from being further dropped, and suppresses the drop of the voltage VDC of the capacitor 30 by reducing power consumption of the motor 80.

When a drop of the voltage VDC of the capacitor 30 is caused by an impedance drop in the overhead wire 1 as mentioned above, the drop of the capacitor voltage VDC can be suppressed by the above-mentioned operation. However, if a short circuit occurs at both ends or their neighborhoods of the capacitor 30 and then the voltage VDC of the capacitor 30 is decreased by discharging, even the above-mentioned operation cannot avoid dropping the capacitor voltage VDC In that case, the voltage VDC further decreases less than the first predetermined value. When the capacitor voltage VDC decreases lower than the supply-side voltage of the converter 20, a current flows into the capacitor 30 from the supply side through the internal anti-parallel diodes of the switching elements 21 to 24 of the converter 20, whereby a current is fed into the short-circuited portion, so that the power converter might be damaged by heat. For that reason, when the capacitor voltage VDC decreases less than a second predetermined value that is set lower than the first predetermined one, the supply-side contactor 10 is also turned off through the signal K.

Moreover, if the voltage VDC of the capacitor 30 decreases less than the maximum generated voltage by the motor 80, a current flows into the capacitor 30 from the motor 80 side through the internal anti-parallel diodes of the switching elements 61 to 66 of the inverter 60, whereby a current is fed into the short-circuited portion, so that the power converter might be damaged by heat. For that reason, when the capacitor voltage VDC decreases less than the second predetermined value, the motor-side contactor 70 is also turned off through the signal MMK.

The second predetermined value for turning off the supply-side contactor 10 and that for turning off the motor-side contactor 70 may be set to be values different from each other. Furthermore, conditions required for turning off the supply-side contactor 10 and the motor-side contactor 70 may be varied based on the supply-side voltage VS or rotation speed of the motor 80. For example, when the motor 80 rotates at low speed, the second predetermined value is set to be a lower value because a low generated voltage by the motor 80 allows a value of the capacitor voltage VDC to be low accordingly, at which the motor-side contactor 70 is to be turned off. With such a manner, the number of switching operations of the supply-side contactor 10 and the motor-side contactor 70 can be decreased because of reduction in occasions for them to operate, making it possible to suppress wear of movable parts of the contactors and thereby to extend their life spans.

(6) Motor Over-Current (Abbreviation: MMOC)

When any one value of the currents IU, IV, and IW measured by the current sensors 93, . . . , 95 becomes a predetermined value or larger, the system controller 100 determines the motor current to be excessively large and determines the current as a motor over-current (hereinafter referred to as "MMOC"). This phenomenon is conceived that it occurs from a temporary disturbance such as a short circuit between output lines of the inverter 60, a short circuit of windings of the motor 80, a control malfunction of the inverter 60, and an abrupt change of the supply voltage.

When the system controller 100 detects an "MMOC", in particular, if it is caused by a short circuit between output lines of the inverter 60, a current due to generated voltage by the motor 80 might flow into the short-circuited portion and increase its damage. For that reason, the system controller turns off the switching elements 61 to 66 of the inverter 60 through the signal IG, to stop their switching operation and further turns off the motor-side contactor 70 through the signal MMK.

The switching elements 21 to 24 of the converter 20 and of the supply-side contactor 10 may also be turned off through the signal CO and the signal K, respectively, to stop their switching operations.

(7) Discharge Circuit Anomaly (Abbreviation: OVCRFF)

The system controller 100, when the feed back signal OVF input thereto from the switching device 52 of the discharge circuit 50 indicates an anomaly of the switching device 52, determines the anomaly as a discharge circuit anomaly (hereinafter referred to as "OVCRFF"). The anomaly of the switching device 52 denotes any situation where an over-current occurs in an internal switching element built therein (not shown), the driving voltage for the switching element decreases, an over-temperature is detected in the switching element, and a discrepancy is detected between an operation made by the switching element and the 'on'/'off' command therefor.

When the system controller 100 detects an "OVCRFF", it is conceived that the capacitor voltage VDC may become unable to be discharged or the discharge operation may become unable to be stopped, predicting a situation where the switching device 52 cannot be turned on, or cannot be turned off while remaining 'on'.

When the capacitor voltage VDC is unable to be discharged owing to incapability of turning on the switch device 52, the capacitor voltage VDC might exceed the withstand voltages of the switching elements 21 to 24 of the converter 20 and the switching elements 61 to 66 of the inverter 60 and break these switching elements. Accordingly, the system controller turns off these switching elements 21 to 24 and 61 to 66 to stop their switching operations through the signal CG and the signal IG. At the same time, the system controller isolates the supply side and the motor side from the discharge circuit 50 by turning off the supply-side contactor 10 and the motor-side contactor 70 through the signal K and the signal MMK, respectively, thereby to eliminate the possibility of a rise in voltage of the capacitor 30 due to an inflow current.

When discharge operation of the switching device 52 is unable to be stopped owing to incapability of turning it off while remaining 'on', the voltage VDC of the capacitor 30 falls to zero. In that case, a current flows into the discharge circuit 50 from the supply side through the internal anti-parallel diodes of the switching elements 21 to 24 of the converter 20, whereby the resistor 51 might be damaged by heat. In order to avoid this, the supply-side contactor 10 is turned off.

Furthermore, a current flows into the discharge circuit 50 from the motor 80 side through the internal anti-parallel diodes of the switching elements 61 to 66 of the inverter 60, whereby the resistor 51 might be damaged by heat. In order to avoid this, the motor-side contactor 70 is also turned off.

(8) Charging Anomaly (Abbreviation: CHGF)

In charging the capacitor 30, when charging of the capacitor 30 is not completed within a predetermined time interval, the system controller determines the incompleteness as a charging anomaly (hereinafter referred to as "CHGF"). While the capacitor 30 is charged, at start up and restart of the electric power converter, from the tertiary winding of the transformer 6 or from the output of an auxiliary power supply (not shown) through a charger (not shown) that is made up of a transformer and a rectifier, a "CHGF" is detected on condition that a value of the voltage VDC of the capacitor 30 does not reach a predetermined value during a predetermined lapse of time after a start of charging.

When a "CHGF" is detected, a ground fault or a short circuit has probably occurred at the capacitor 30 or a part of the circuit therearound. The system controller 100, therefore, turns off the switching elements 21 to 24 and the switching elements 61 to 66 through the signal CG and the signal respectively, to stop their switching operations. At the same time, the system controller turns off the supply-side contactor 10 and the motor-side contactor 70 through the signal K and the signal MMK, respectively, to isolate the supply side and the motor side from the capacitor 30, whereby a current is prevented from flowing into the short circuit portion from the supply side or the motor 80 side.

(9) Microcomputer Anomaly (Abbreviation: WDT)

When an anomaly of a internal microcomputer (hereinafter referred to as "micom") is detected by a micom anomaly detector (not shown), the system controller 100 determines the anomaly as a micom anomaly (hereinafter referred to as "WDT").

Since various methods of detecting a micom anomaly exist in prior arts, their detailed explanations are omitted. The micom anomaly detector is made up of hardware components different from those of the micom executing software and configured so as to be able to turn off, not via the micom, the supply-side contactor 10, the motor-side contactor 70, the converter 20, and the inverter 60, and turn on the discharge circuit 50. The anomalous phenomenon of the micom is conceived that it occurs from an abnormal software processing result of the micom affected by a temporary noise, a halt of software processing by the micom being halted owing to a failure of parts and the like on the circuit board mounting the micom, or a bug and the like in software executed on the micom.

When a "WDT" is detected, the software might be abnormally executed, so that the system controller 100 might output a false signal to the converter 20, the inverter 60, the discharge circuit 50, the supply-side contactor 10, or the motor-side contactor 70, which may lead the switching elements 21 to 24 and the switching elements 61 to 66 to be broken. For that reason, the micom anomaly detector, through the signal CG, the signal IG, and the signal OVG not via the micom, turns off the switching elements 21 to 24 and the switching elements 61 to 66 to stop their switching operations, and at the same time, turns on the discharge circuit 50 to discharge the capacitor 30, whereby these switching elements are prevented from being applied with a voltage. Since the voltage of the capacitor 30 decreases with the discharging, a current flows into the discharge circuit 50 from the supply side through the internal anti-parallel diodes of the switching elements 21 to 24 of the converter 20, whereby the resistor 51 might be damaged by heat. The supply-side contactor 10 is therefore turned off through the signal K. Similarly, a current also flows into the discharge circuit 50 from the motor 80 side through the internal anti-parallel diodes of the switching elements 61 to 66 of the inverter 60, whereby the resistor 51 might be damaged by heat. The motor-side contactor 70 is therefore turned off through the signal MMK.

(10) Control Power-Supply Anomaly (Abbreviation: PSLV)

When an anomaly such that a voltage of the built-in control power supply (not shown) becomes out of a predetermined range is detected by a control power-supply anomaly detector (not shown)—a low-voltage power supply that generally outputs voltages of 15 V, 5 V, and the like for the micom and electronic circuits—, the system controller 100 determines the anomaly as a control power-supply anomaly (hereinafter referred to as "PSLV"). When such a situation occurs where voltage of a power supply for each electromagnetic coil 12 of the supply-side contactor 10 and the motor-side contactor 70, and voltage of a power supply for driving the switching elements of the converter 20 and those of the inverter 60 fall equal to or below respective predetermined values, the system controller also determines these low voltages as PSLVs.

When a "PSLV" is detected, the micom might not operate normally, and the switching elements 21 to 24 and the switching elements 61 to 66 might be broken owing to voltage reduction if the power supply voltage for driving the switching elements of the converter 20 and those of the inverter 60 decreases. In this case, the system controller 100 immediately turns off the switching elements 21 to 24 and the switching elements 61 to 66 to stop their switching operations, and at the same time, turns on the discharge circuit 50 to discharge the capacitor 30, whereby these switching elements are prevented from being applied with a voltage. Since the voltage of the capacitor 30 decreases with the discharging, a current flows into the discharge circuit 50 from the supply side through the internal anti-parallel diodes of the switching elements 21 to 24 of the converter 20, whereby the resistor 51 might be damaged by heat. The supply-side contactor 10 is therefore turned off through the signal K. Similarly, a current also flows into the discharge circuit 50 from the motor 80 side through the internal anti-parallel diodes of the switching elements 61 to 66 of the inverter 60, whereby the resistor 51 might be damaged by heat. The motor-side contactor 70 is therefore turned off through the signal MMK.

Since the discharge circuit 50 needs to be reliably turned on even in a situation where power from the control power supply is completely cut off, the system controller 100 and the discharge circuit 50 each have a backup power-source circuit (not shown) made up of a power storage element such as an electrolyte capacitor to hold the control power-supply voltage after the power fed from the control power supply is stopped and to hold the 'on' state of the switching device 52 till the discharge is completed (usually for about three seconds). With the above configuration, even if power from the control power supply is abruptly cut off during operating, the capacitor 30 can be reliably discharged and the supply-side contactor 10 and the motor-side contactor 70 can be turned off, so that the power electric converter, inclusive of the switching elements 21 to 24 and the switching elements 61 to 66, can be avoided being broken.

(11) Motor Current Imbalance (Abbreviation: PUD)

When an imbalance value between the motor currents IU, IV and IW measured by the current sensors 93 to 95 becomes larger than a predetermined value, the system controller 100 determines the imbalance as a motor current imbalance (hereinafter referred to as "PUD").

When a "PUD" is detected, there might be a break in a winding of the motor 80 or a phase missing by a switching element (failure to turn on). In this case, the system controller 100 determines that the operation of the power converter is difficult to continue, and turns off the switching elements 21 to 24 and the switching elements 61 to 66 to stop their switching operations, and turns off the supply-side contactor 10 and the motor-side contactor 70 through the signal K and the signal MMK, respectively.

(12) Rotation Sensor Anomaly (Abbreviation: RSD)

When a position signal θ measured by the rotation sensor 96 is anomalous, the system controller 100 determines the anomaly as a rotation sensor anomaly (hereinafter referred to as "RSD". Since methods of detecting an anomaly of the position signal θ exist in prior arts, their explanations are omitted here.

When a "RSD" is detected, a current control of the motor 80 is not normally performed, and occurrence of such a phenomenon is conceivable as an over-current of the motor due to a control malfunction and damage of a switching element associated therewith, and an over-voltage of the capacitor voltage VDC due to electric power generated by the motor 80 flowing into the capacitor 30. For that reason, the system controller determines that the operation of the power converter is difficult to continue, and turns off the switching elements 21 to 24 and the switching elements 61 to 66 to stop their switching operations and turns off the supply-side contactor 10 and the motor-side contactor 70 through the signal K and the signal MMK, respectively.

(13) Ground Fault of Main Circuit (Abbreviation: GD)

The system controller 100, when the signal IGS input thereto from the ground fault detector 44 provided in the grounding circuit 40 indicates a ground fault of the main circuit, determines the indication as a ground fault of the main circuit (hereinafter referred to as "GD").

Figure 3:
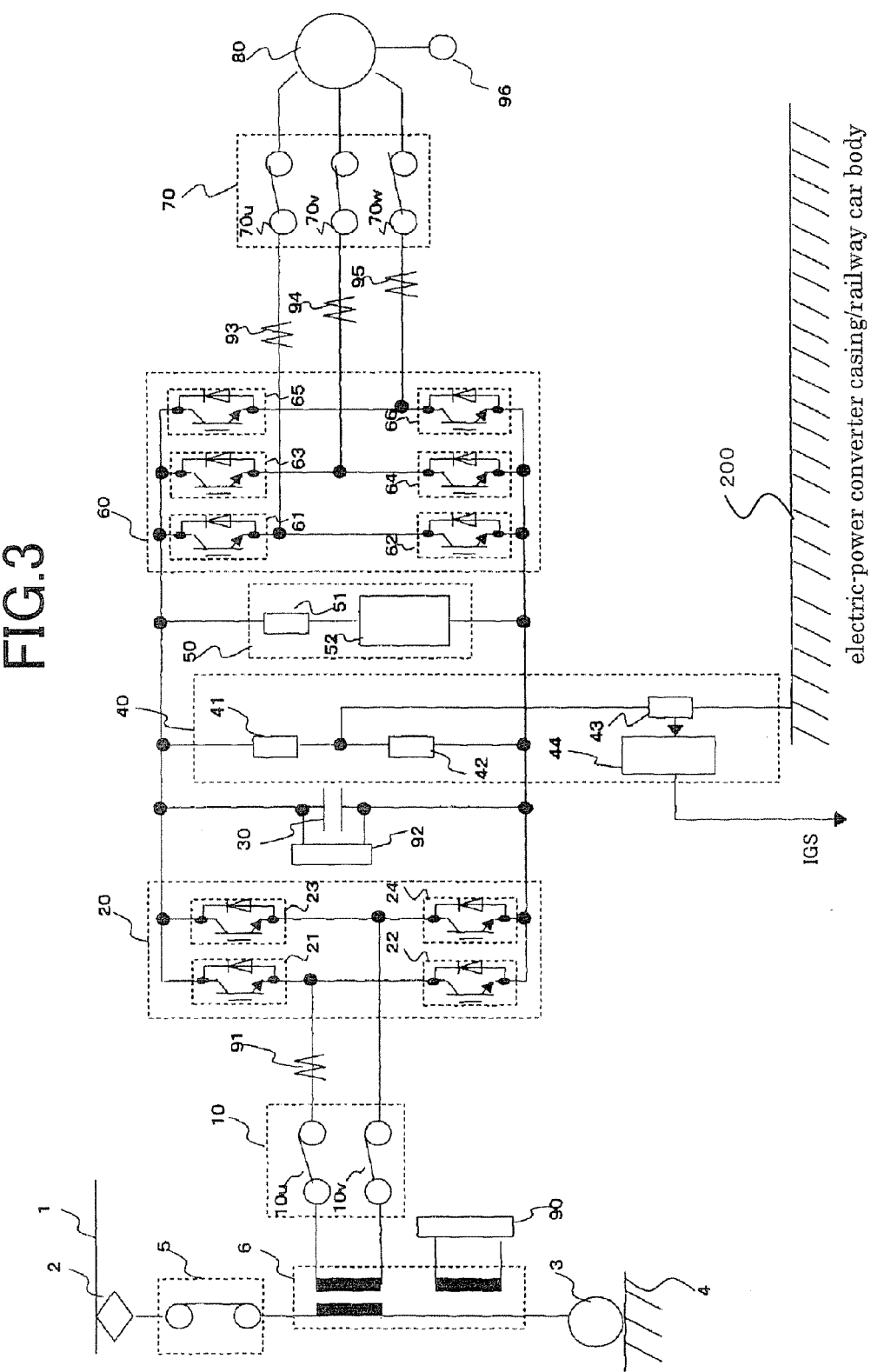
FIG. 3 is a diagram illustrating a grounding system of the electric power converter according to Embodiment 1 under normal conditions.

Here, a description will be made on a grounding system of the electric power converter according to the invention and a ground fault phenomenon of the main circuit. FIG. 3 is a diagram illustrating the grounding system of the electric power converter of Embodiment 1 under normal condition. As shown in FIG. 3, the grounding system is configured in such a manner that the voltage VDC of the capacitor 30 is divided by impedance elements 41 and 42 included in the grounding circuit 40 to ground a potential intermediate to the voltage VDC to the electric-power converter casing/railway car body 200 through an impedance element 43. In such a configuration, since no large current except for a high frequency current associated with the operations of the switching elements 21 to 24 and the switching elements 61 to 66 passes through the impedance element 43 under normal condition, the signal IGS input into the system controller 100 from the ground fault detector 44 indicates no grand fault of the main circuit.

Figure 4:
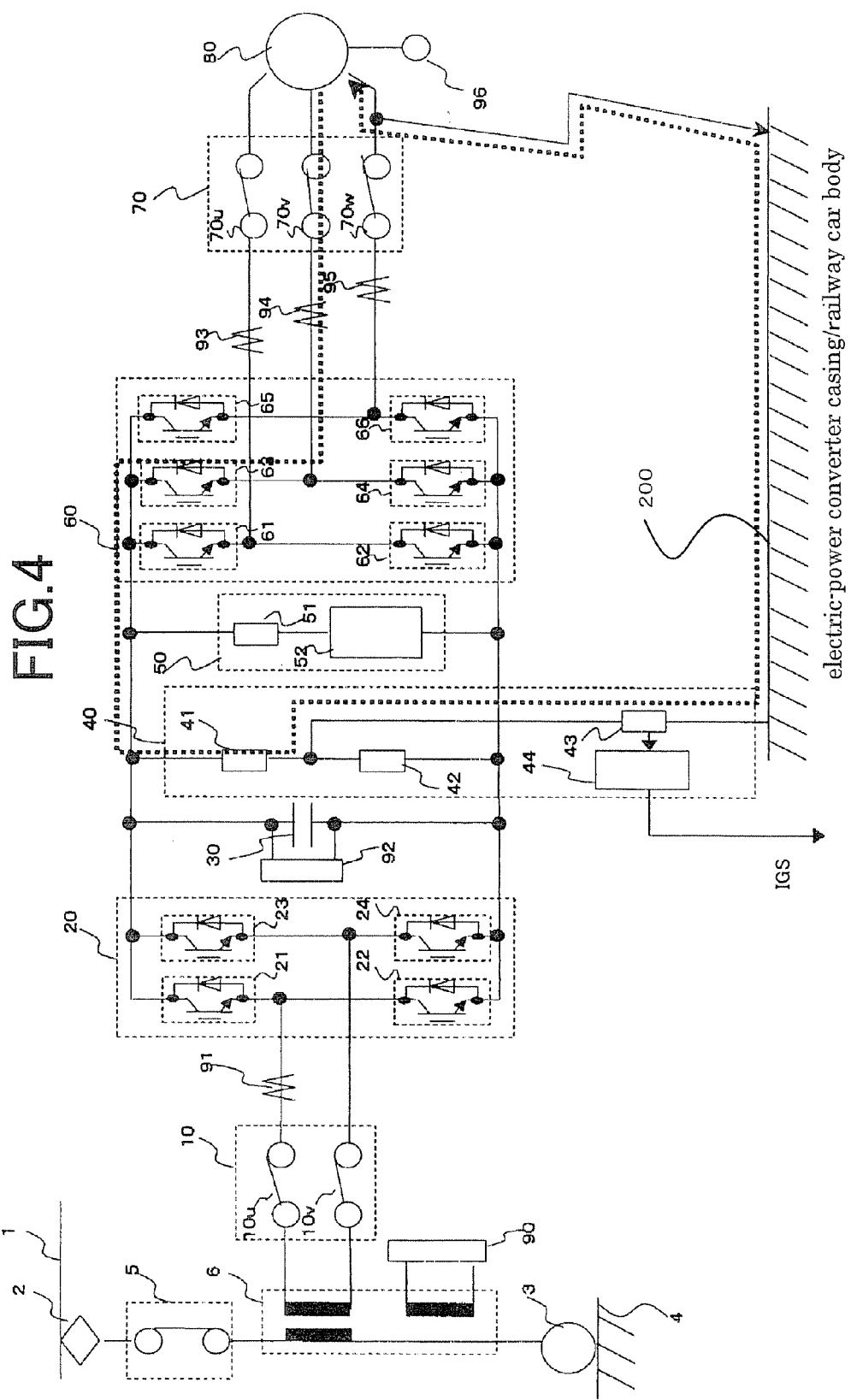
FIG. 4 is a diagram illustrating the grounding system of the electric power converter according to Embodiment 1 under a ground fault condition of its main circuit.

FIG. 4 is a diagram illustrating the grounding system of the electric power converter of Embodiment 1 under a ground fault condition of the main circuit. In FIG. 4, a case is shown as an example in which one of the three phase lines of the motor 80 is grounded to the electric-power converter casing/railway car body 200. In this case, a ground fault current flows through the impedance element 43 via the electric-power converter casing/railway car body 200 as shown by the dotted line in FIG. 4, and the ground fault detector 44 informs, based on this, the system controller 100 of the ground fault of the main circuit through the signal IGS input into the controller.

When the electric railway car is running in that case, even though the switching elements 61 to 66 of the inverter 60 are turned off, a ground fault current continues to flow through the internal diodes of the switching elements 61 to 66 owing to a generated voltage by rotation of the motor 80, damaging the power converter. For that reason, the motor-side contactor 70 needs to be turned off.

When a ground fault occurs around the input and output ports of the converter 20 other than the ground fault path shown in FIG. 4, the supply-side contactor 10 also needs to be turned off in order to cut off a grand fault current path from the supply side. Furthermore, the discharge circuit 50 is turned on to discharge the capacitor 30 that may otherwise be a source of a fault current.

As described above, the system controller 100, when detecting a "GD", turns off the switching elements 21 to 24 and the switching elements 61 to 66, and turns on the discharge circuit 50 through the signal OVG, to discharge the capacitor 30, and also turns off the supply-side contactor 10 and the motor-side contactor 70 through the signal K and signal MMK, respectively.

(14) Contactor Anomaly (Abbreviation: KD)

When the following situation occurs:
although the system controller commands the supply-side contactor 10 or the motor-side contactor 70 to be turned on through the signal K or the signal MMK, respectively, the respective main contacts 11 and auxiliary contacts 13 synchronized therewith are not turned on and, as a result, such a state continues for a predetermined time interval where the feed back signal KF or the feed back signal MMKF does not indicate their 'on' state, or
although the controller commands either contactor to be turned off through the signal K or the signal MMK, the respective main contacts 11 and auxiliary contacts 13 synchronized therewith are not turned off and, as a result, such a state continues for a predetermined time interval where the feed back signal KF or the feed back signal MMKF does not indicate their 'off' state,
the system controller 100 determines the situation to be a malfunction of the supply-side contactors 10 or the motor-side contactor 70 and determines the situation as a contactor anomaly (hereinafter referred to as "KD"). This is because that the determination of the contactor anomaly is made by detecting occurrence of a specific phenomenon in which an operation time of the contactors is elongated more than a given value of time. By thus detecting such an anomaly, measures can be taken before the anomaly further develops to reach the situation where a contactor does not work for a command thereto.

In addition, detection of such a contact anomaly may be performed on a contactor unit basis of the supply-side contactor 10 and the motor-side contactor 70, or performed individually for the supply-side contactor 10u and 10v, and the motor-side contactor 70u, 70v, and 70w.

When a "KD" is detected, not only the main circuit cannot operate normally, but also the motor 80 cannot be isolated from the inverter 60 or the converter 20 cannot be isolated from the supply side even when the isolations are needed in occurrence of each anomaly having been described, which might lead the power converter to come into a more damaged state.

The system controller therefore turns off the switching elements 21 to 24 and the switching elements 61 to 66 through the signals CG and IG, respectively, to stop their switching operations, and turns on the discharge circuit 50 through the signal OVG to discharge the capacitor 30 and turns off the supply-side contactor 10 and the motor-side contactor 70 through the signals K and MMK respectively.

In addition, the contactors are assumed here that they can be turned on and off, but their operations take longer time. Accordingly, the supply-side contactor 10 and the motor-side contactor 70 are assumed that they can be turned off. When an anomaly of the supply-side contactor 10 is detected, the breaker 5 may also be turned off taking into account a situation where the supply-side contactor 10 cannot be turned off.

(15) Converter Switching-Element Anomaly (Abbreviation: IPMFDC)

The system controller 100 monitors the signal CGF input thereto from the converter 20, and when the signal CGF indicates any situation where an over-current occurs in one of the switching elements, the driving voltage for the switching elements decreases, an over-temperature is detected in one of the switching elements, and a discrepancy is detected between an 'on'/'off' status of the switching elements and an 'on'/'off' command therefor, the controller determines the situation as a converter switching-element anomaly (hereinafter referred to as "IPMFDC"). Any of these phenomena might lead breakage of the switching elements.

The system controller 100, when detecting an "IPMFDC", turns off the switching elements 21 to 24 of the converter 20 through the signal CG to stop their switching operations so that they are not broken, and at the same time, turns on the discharge circuit 50 through the signal OVG to discharge the capacitor 30 through the switching device 52 and the resistor 51. Moreover, the controller concurrently turns off the switching elements 61 to 66 of the inverter 60 through the signal IG to stop their switching operations.

On that occasion, when the voltage VDC of the capacitor 30 falls below that of supply-side of the converter 20, a current flows into the capacitor 30 and the discharge circuit 50 from the supply side through the internal anti-parallel diodes of the switching elements 21 to 24 of the converter 20, whereby the resistor 51 might be damaged by heat. The supply-side contactor 10 is therefore turned off through the signal K. Similarly, when the voltage VDC falls below the maximum generated voltage by the motor 80, a current flows into the capacitor 30 and the discharge circuit 50 from the motor 80 side through the internal anti-parallel diodes of the switching elements 61 to 66 of the inverter 60, whereby the resistor 51 might be damaged by heat. The motor-side contactor 70 is therefore turned off through the signal MMK.

(16) Inverter Switching-Element Anomaly (Abbreviation: IPMFDI)

The system controller 100 monitors the signal IGF input thereto from the inverter 60, and when the signal IGF indicates any situation where an over-current occurs in one of the switching elements, the driving voltage for the switching elements decreases, an over-temperature is detected in one of the switching elements, and a discrepancy is detected between an 'on'/'off' status of the switching elements and an 'on'/'off' command therefor, the controller determines the situation as an inverter switching-element anomaly (hereinafter referred to as "IPMFDI"). Any of these phenomena might lead breakage of the switching elements.

The system controller 100, when detecting an "IPMFDI", turns off the switching elements 61 to 66 of the inverter 60 through the signal IG to stop their switching operations so that they are not broken, and at the same time, turns on the discharge circuit 50 through the signal OVG to discharge the capacitor 30 through the switching device 52 and the resistor 51. Moreover, the controller concurrently turns off the switching elements 21 to 24 of the converter 20 through the signal CG to stop their switching operations.

On that occasion, when the voltage VDC of the capacitor 30 falls below the supply-side voltage of the converter 20, a current flows into the capacitor 30 and the discharge circuit 50 from the supply side through the internal anti-parallel diodes of the switching elements 21 to 24 of the converter 20, whereby the resistor 51 might be damaged by heat. The supply-side contactor 10 is therefore turned off through the signal K. Similarly, when the voltage VDC falls below the maximum generated voltage by the motor 80, a current flows into the capacitor 30 and the discharge circuit 50 from the motor 80 side through the internal anti-parallel diodes of the switching elements 61 to 66 of the inverter 60, whereby the resistor 51 might be damaged by heat. The motor-side contactor 70 is therefore turned off through the signal MMK.

Up to this, finished is the explanation on the methods of detecting each anomalous phenomenon and on measures to be taken thereagainst. In addition, the system controller 100 is configured to record therein details of the above-mentioned anomalous phenomena whenever any of them occurs, and at the same time, informs of the anomaly an external device provided in the driver's cab or the like. Such a configuration allows quick clarification on causes of anomalous phenomena.

When the anomaly listed below particularly occurs, the main circuit would probably be short-circuited or ground-faulted, which may lead to occurrence of a large fault current. Therefore, the breaker 5 is further turned off.

(8) Charging Anomaly (abbreviation: CHGF)
(13) Ground Fault of Main Circuit (abbreviation: GD)
(15) Converter Switching-Element Anomaly (abbreviation: IPMFDC)
(16) Inverter Switching-Element Anomaly (abbreviation: IPMFDI)

On the other hand, the following anomaly:

(11) Motor Current Imbalance (abbreviation: PUD)
(12) Rotation Sensor Anomaly (abbreviation: RSD) would not occur or exerts little influence if occurs during coasting of the railway car. Accordingly, the processes of detecting both anomalies may be stopped so as not to detect them during coasting of the railway car (that is, the converter 20 and the inverter 60 are stopped).

As has been described above, the explanations are made on specific anomalies and details of failures that might possibly occur in an electric power converter that drives and controls a permanent-magnet synchronous motor, and made on measures against the individual details. By providing a system controller having a protective function capable of taking proper measures against the failures that might possibly occur, it is possible to avoid, for example, shortening life span of the contactors due to the number of switching actions increased by excessive protective operations at occurrence of anomalies, taking time to restart the power converter due to time required for reclosing the contactors and charging the capacitor, and disturbing service of the railway car due to frequent stops of the electric power converter. Moreover, increase in damage of an anomalous portion due to improper measures can be prevented. Therefore, an electric power converter capable of stable operation can be obtained.

In this way, according to the present invention, it is possible to provide an electric power converter that is able to perform a method of taking measures against specific anomalous phenomena that might possibly occur in electric power converters that drive and control permanent-magnetic synchronous motors, and also has a protective function capable of taking proper measures against various anomalous phenomena that might possibly occur.

The configuration described in Embodiment is an exemplar of the subject matter of the invention, and can be combined with another technology as in the prior art also can be modified, for example, partly omitted, within the scope of the invention.

While the subject matters of the invention have been described, in the specification, for the case where the electric power converter applied to a controller for an electric railway car, applicable fields are not limited to this. The invention can also be applied to various related fields such as electric motor-cars and elevators.

What is claimed is:

1. An electric power converter comprising:
  a converter having switching elements, for converting AC power from an AC power supply into DC power;
  a capacitor connected in parallel to a DC side of said converter;
  an inverter having switching elements and being connected in parallel with said capacitor, for driving and controlling a permanent-magnet synchronous motor;
  a supply-side switch interposed between the AC power supply and an AC side of said converter;
  a motor-side switch interposed between said inverter and the permanent-magnet synchronous motor;
  a capacitor-voltage sensor for measuring voltage across said capacitor; and
  a system controller for controlling said supply-side switch, said converter, said inverter, and said motor-side switch by receiving an input signal from said capacitor-voltage sensor, wherein
  said system controller, when a voltage measured by said capacitor-voltage sensor becomes equal to or lower than a first predetermined value, turns off all switching elements of said converter and all switching elements of said inverter;
  when the voltage measured by said capacitor-voltage sensor becomes equal to or lower than a second predetermined value that is smaller than the first predetermined value, turns off said supply-side switch; and
  when the voltage measured by said capacitor-voltage sensor becomes higher than the second predetermined value, does not turn off said supply-side switch.

2. The electric power converter of claim 1, further comprising a supply-voltage sensor for measuring voltage of the AC power supply, wherein said system controller further receives an input signal from supply-voltage sensor, and said system controller sets the second predetermined value, based on voltages measured by said supply-voltage sensor or output voltage frequency of said inverter.

3. An electric power converter comprising:

a converter having switching elements, for converting AC power from an AC power supply into DC power;

a capacitor connected in parallel to a DC side of said converter;

an inverter having switching elements and being connected in parallel with said capacitor, for driving and controlling a permanent-magnet synchronous motor;

a supply-side switch interposed between the AC power supply and an AC side of said converter;

a motor-side switch interposed between said inverter and the permanent-magnet synchronous motor;

a capacitor-voltage sensor for measuring voltage across said capacitor; and a system controller for controlling said supply-side switch, said converter, said inverter, and said motor-side switch by receiving an input signal from said capacitor-voltage sensor, wherein said system controller, when a voltage measured by said capacitor-voltage sensor becomes equal to or lower than a first predetermined value, turns off all switching elements of said converter and all switching elements of said inverter;

when the voltage measured by said capacitor-voltage sensor becomes equal to or lower than a second predetermined value that is smaller than the first predetermined value, turns off said motor-side switch; and when the voltage measured by said capacitor-voltage sensor becomes higher than the second predetermined value, does not turn off said motor-side switch.

4. The electric power converter of claim 3, further comprising a supply-voltage sensor for measuring voltage of the AC power supply, wherein said system controller further receives an input signal from said supply-voltage sensor, and said system controller sets the second predetermined value, based on voltages measured by said supply-voltage sensor or output voltage frequency of said inverter.

* * * * *